United States Patent [19]

Louvier

[11] Patent Number: 4,504,436
[45] Date of Patent: Mar. 12, 1985

[54] PROCESS AND APPARATUS FOR REDENSIFYING THERMOPLASTIC RESIN FOAM

[75] Inventor: Yvon Louvier, Haine St. Pierre, Belgium

[73] Assignee: Synfina, S.A., Brussels, Belgium

[21] Appl. No.: 511,599

[22] Filed: Jul. 7, 1983

[30] Foreign Application Priority Data

Jul. 16, 1982 [LU] Luxembourg ............................ 84277

[51] Int. Cl.³ ............................................. B29D 27/00
[52] U.S. Cl. ........................... 264/321; 264/DIG. 69; 425/373; 425/456; 425/817 C; 425/DIG. 46
[58] Field of Search ................. 264/37, 321, DIG. 69; 425/373, 456, DIG. 46, 817 C

[56] References Cited

U.S. PATENT DOCUMENTS

| 3,607,999 | 9/1971 | Corbett et al. | 264/37 X |
| 3,723,582 | 3/1973 | Winstead | 264/37 |
| 3,859,404 | 1/1975 | Immel et al. | 264/37 X |
| 4,254,068 | 3/1981 | Otsuka | 264/321 X |
| 4,396,566 | 8/1983 | Brinkmann et al. | 425/456 X |

Primary Examiner—Philip Anderson
Attorney, Agent, or Firm—John K. Abokhair

[57] ABSTRACT

Disclosed is a process for increasing the density of thermoplastic resin foam waste material having apparent density as low as 5 kg/m³. The waste material in particle form is uniformly dispersed onto at least one vibrating plate of a furnace, and then heated to a temperature ranging between about 120° C. and about 210° C. The waste material is then compacted at the outlet end of the furnace and ground into particles of uniform size to be reused as thermoplastic resin material.

17 Claims, 1 Drawing Figure

PROCESS AND APPARATUS FOR REDENSIFYING THERMOPLASTIC RESIN FOAM

BACKGROUND OF THE INVENTION

The present invention relates to a process and apparatus for treating wastes of thermoplastic resin foam in order to prepare them for reuse particularly for reuse in an extrusion process. More particularly, the present invention relates to a process for increasing the apparent density of foamed thermoplastic resin waste material.

It is well known that foamed thermoplastic resin waste materials are difficult to handle due to their bulkiness. In order to decrease the bulk of these waste materials and reduce the area required for their storage, processes are utilized to increase the apparent density of the waste material, allowing it to be reused.

According to conventional processes presently used to increase the apparent density of foamed thermoplastic resin, a pulverized waste material is introduced into a screw extruder to transform the material into a product of higher apparent density. The resulting product is then repelletized in the usual manner. The main drawback with this type of process is the difficulty in feeding the waste material to the extruder screw due to the low apparent density of the waste material. Moreover, the extruder flow rate is reduced as the apparent density of the wastes to be treated decreases. In order to overcome these problems, it has been proposed to use a screw extruder having a conical feed orifice along with an extruder housing having a variable diameter. Due to the cost of such apparatus, however, it is not economically attractive. In addition, this apparatus provides no significant increase in flow rate.

Another problem with the conventional processes using a screw extruder reside in their inability to reduce the water content of the waste materials. The presence of water not only causes the extruder screw to slip, but also results in a product which is improperly vented. Moreover, according to the conventional retreatment processes of thermoplastic resin foam wastes, it is difficult to increase the density of expanded beads to a point where they may be reused as expandable beads for reimpregnation with a blowing agent.

Also in conventional processes using a screw extruder to retreat thermoplastic waste materials containing common additives such as fire retardants, the waste materials degraded rapidly while causing degradation of the extruder itself. Therefore, what is needed is a process to increase the apparent density of foam resin wastes thereby increasing the production flow rate of the processed material, while simultaneously allowing for the treatment of waste material having a very low apparent density. These low apparent density materials typically comprise expandable thermoplastic beads of polystyrene. Also needed is a relatively simple apparatus useful for achieving the above objects.

SUMMARY OF THE INVENTION

An object of the present invention therefore is to provide a process for increasing the apparent density of foamed thermoplastic resin waste at production flow rates higher than those generally found in conventional equipment.

A further object of the present invention is to provide a process for increasing the apparent density of foamed thermoplastic resin waste material, such as expandable polystyrene beads, having a relatively low apparent density.

A further object of the present invention is to provide a process for increasing the apparent density of foamed thermoplastic resin waste material to obtain a product having a residual gas content which is not only very low but is also constant.

Still a further object of the present invention is to provide a process for increasing the apparent density of foamed thermoplastic resin waste materials containing common additives such as fire retardants, without any degradation of the final product.

Another object of the present invention is to provide a process which increases the apparent density of foamed thermoplastic resin waste material containing water therein, without having a detrimental effect on the process equipment.

These and other objects are achieved by introducing foamed polymer waste materials uniformly across at least one vibrating plate in a furnace to expose the material to heat eminating from above the vibrating plate. The waste material is then transported across the vibrating plate such that the waste material tumbles while being heated at a temperature of at least 120° C. at the furnace inlet and less than about 210° C. at the furnace outlet. The volume of the waste material is then reduced at least 75%, usually by compacting, resulting in a processed waste material. The processed material is then cooled and introduced into a grinder to obtain uniformly sized particles for reuse as resin feed material.

The process of the present invention allows for the production of materials having an increased apparent density at very high flow rates. These high flow rates are achieved with foams having an apparent density as low as 5 kg/m$^3$, without any resulting degradation of the processed material.

The present invention also discloses apparatus for carrying out the process of the present invention. The apparatus comprises means to introduce thermoplastic waste materials into a furnace including several plates in cascading order. The apparatus also includes means to disperse these wastes uniformly onto the upper plate of the furnace, and means to convey the wastes into the furnace, causing the waste material to tumble within the furnace. In addition, there is included means to recover the waste material from the furnace, and means to reduce the volume of these wastes at least 75%. In addition, there are means to cool the compacted wastes, and means to grind the waste material into particles for further reuse.

DETAILED DESCRIPTION OF THE INVENTION

Figure 1:
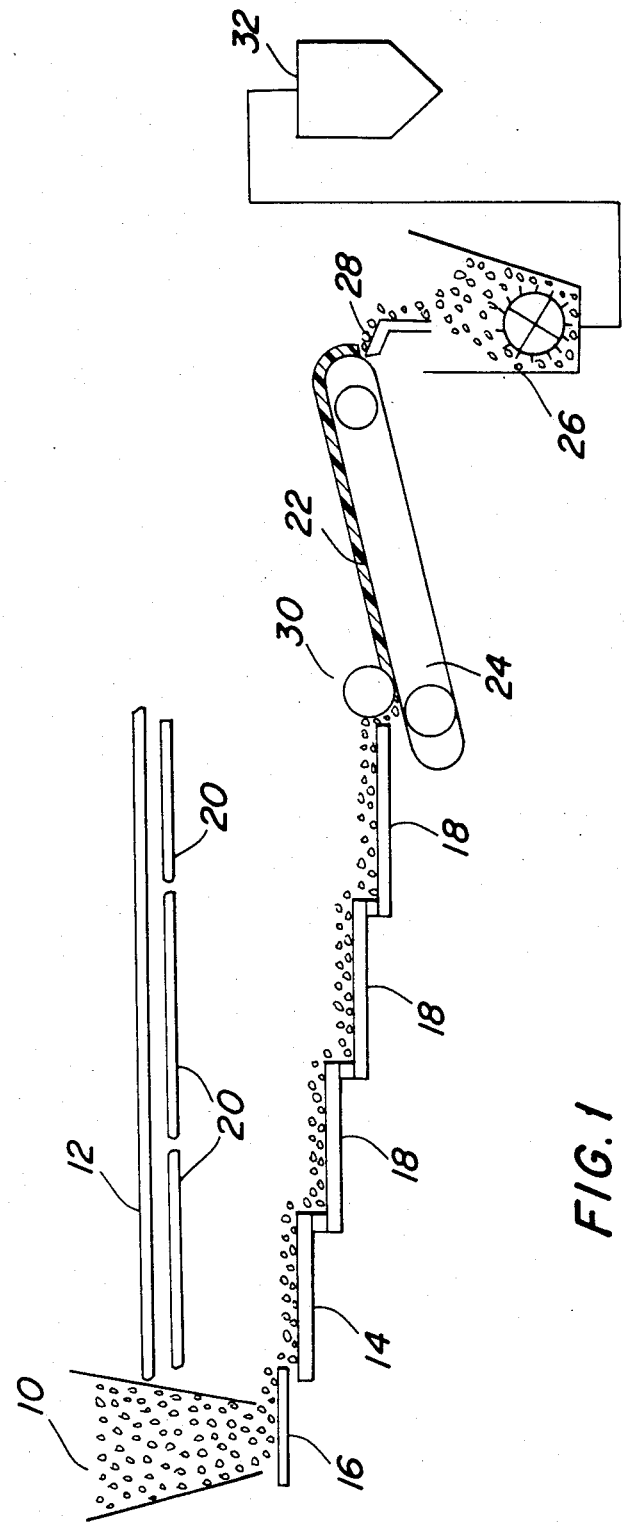
FIG. 1 is a schematic view of the apparatus for increasing the apparent density of thermoplastic resin foam waste materials in acordance with the process of the present invention.

The present invention relates to a process and apparatus for increasing the apparent density of thermoplastic resin foam waste materials. Apparent density is defined as the average density of a significant volume of a homogenous sample of foamed polymer beads. Thermoplastic resin foam waste materials are defined as discarded, used articles such as beverage and food containers, insulation, packing materials, and others made of a foamed, expanded polymer such as expanded polystyrene. Typical thermoplastic resin waste materials amenable to redensification by the process of the present invention include expanded polystyrene, particularly sheets of extruded expanded polystyrene and boards made of the same material, expanded polyethylene and the expandable beads of polystyrene or polyethylene.

Referring to FIG. 1, foamed thermoplastic resin waste material is introduced into a hopper 10 of a furnace 12. Furnace 12 comprises a conventional overhead-heated chamber utilizing gas, oil, electric infra-red or other conventional heating means. When increasing the apparent density of expanded beads of a thermoplastic resin, the furnace 12 is fed directly with the beads since it is practically impossible to regrind this type of material. The term "expandable beads" means beads of thermoplastic material which contain a blowing agent, but which have not yet been subjected to steam to expand the bead to a larger size. The term "expanded beads" refers to thermoplastic material impregnated with blowing agent and subjected to steam or the like to expand the beads to a larger size and lower density. In some cases, it is preferable to feed furnace 12 with waste materials which have been ground by a grinder sieve having a mesh size between 5 and 7 mm, however, the particles of ground material may have smaller average dimensions. Typical particle size distributions of ground waste materials which are subject to the process of the present invention and which come from boards or sheets of extruded or thermoformed foam are as follows:

| Average Size (mm) | Quantity Material #1 (%) | Quantity Material #2 (%) |
| --- | --- | --- |
| 1.7 | 28 | 35 |
| Greater than 1.7 but less than 2.6 | 18 | 32 |
| Greater than 2.6 but less than 4.0 | 41 | 1 |
| Greater than 4 but less than 10 | 12 | 30 |
|  | 99 | 98 |
| Density of Waste Material (kg/m³) | 38 | 58 |

The apparent density of thermoplastic resin foam wastes used in the process of the present invention may be as low as 5 kg/m³. However, it is preferable to treat waste materials having an apparent density between about 25 and about 150 kg/m³.

Foamed waste materials of thermoplastic resins in the form of beads or as ground material, are dispersed from a hopper 10 uniformly onto an upper vibrating plate 14 of furnace 12. Uniformity of dispersion of the particles or beads is obtained by using apparatus well known by those skilled in the art; however, for the purposes of this invention, an electromagnetic exciter 16 is preferably used to subject the plate on which the particles are dispersed to vibrations. If the dispersion of the waste material is not uniform, the waste material will be subject to different residence times inside the furnace. In addition, if portions of the vibrating plate 14 are not covered with the waste material, hot spots will result which degrade the polymer in the waste material which comes into contact with the hot spots. After the waste material has been dispersed onto the upper vibrating plate 14 of furnace 12, then it is transported through the inside of the furnace by vibrations of the plate. To aid in the process of the present invention, additional vibrating plates 18 may be added to the furnace 12. The plates 14, 18 are disposed in cascading order to tumble the material through the furnace, resulting in more uniform heating thereof. The rate of flow through the furnace is controlled by varying either the vibration amplitude or frequency, or both, of the vibrating plates, and further by varying the input rate of feed material. The number of vibrating plates 14, 18 depend on the residence time required for the material in the furnace, and on the temperature profile to which the material to be treated is submitted. During the progress of the material through furnace 12, the material is progessively heated in accordance with a desired temperature profile. Another advantage to the furnace and vibrating plate construction, in addition to the stepped temperature and progressive heating, is the cascading and tubling acton on the particles established by the vibrating plates and also their stepped configuration. This action constantly turns and rotates the particles to obtain an even surface exposure to the heating elements 20. When processing polystyrene foam, inlet temperatures of at least 150° C. and outlet temperatures of less than 210° C. are maintained. It is preferred, however, that inlet temperatures of at least 190° C. and outlet temperatures less than 200° C. are maintained. The temperature near the outlet end of furnace 12 must not exceed 220° C. due to a risk of the thermoplastic material adhering to the plates 14, 18, causing unwanted polymer degradation. When processing polyethylene foam, inlet temperatures of at least 120° C. and outlet temperatures of less than 140° C. are desired. The residence time of the material in the furnace is from about 2 to about 10 seconds, and preferably from about 2 to about 5 seconds. The heating elements are at staged temperatures to provide a progressively higher temperature in the furnace from the inlet to the outlet.

According to one embodiment of the process of the present invention, the above temperature profile is maintained with at least two heating means 20, and preferably three; the third heating means being located above the lowest vibrating plate 18. Any heating means known by those skilled in the art may be used, however, it is preferable to use either electrical resistance heaters or infra red heaters having wave lengths between 1.5 and 10 micrometers. This allows the material to be progressively heated, not only avoiding the formation of hot spots on vibrating plates 14, 18, but also allowing for uniform treatment of the material due to the tumbling action of the material through the furnace 12 as well as due to the vibrational movement imparted by the plates.

It has been unexpectedly found that the combination of the uniform dispersion of the waste material by the electromagnetic exciter, transportation of the material to be treated through several vibrating plates, and the particular temperature profile to which the material is treated, allows for an increase in the production rate of the processed waste material, even when starting the operation with a thermoplastic resin foam waste having an apparent density as low as 5 kg/m³. An additional advantage of the present invention is that it does not require the use of a screw extruder.

After leaving the lower vibrating plate 18, the waste material is compacted by a roller 30 in order to reduce its volume by at least about 75%. The processed material then drops onto a carpet 22 of conveyor belt 24 for transportation to a grinder 26. An alternate embodiment utilizes one or more pairs of opposed rollers having intermeshing knives on their surfaces to both compress and shred the material simultaneously. This embodiment replaces the grinder 26 and roller 30 of the previous embodiment.

To facilitate the process, a scraper 28 is positioned at the end of conveyor belt 24 in order to remove any pieces of processed material that might be adhering thereto. An increase in the temperature of the material occurs during grinding. Consequently, if the material conveyed to the grinder 26 is too hot, further increases in temperature from grinding may raise the thermoplastic resin to its melting temperature, resulting in blockage of the grinder passageways. In order to avoid this problem, the waste material from furnace 12 is cooled by air contact on the conveyor belt, during free-fall to the grinder 26 or by pneumatic transport to the grinder.

It is well known that the density of the waste material is increased by the temperature increase due to the work energy imparted thereto by grinder 26. However, this heating in the grinder may be controlled, and therefore it is possible to control the densification occurring in the grinder. This may be done by changing the diameter of the mesh used in grinder 26 and by the aforementioned pneumatic precooling.

After passing through grinder 26, the particles of processed material are recovered and sent to a storage silo (not shown).

It has been observed that the thickness of the waste material on the upper vibrating plate 14 may be regulated to vary the flow rate of the material without damaging the processed material or the production rate, by regulating the residence time of the waste material inside the furnace 12. In addition, it has been found that the process of the present invention allows for the treatment of thermoplastic foam containing some water. In fact it has been found that in order to obtain even greater increases in the apparent density of expandable polystyrene beads in accordance with the process of the present invention, it is advantageous to wet the beads with water prior to dispersing them onto the upper vibrating plate 14 of furnace 12. It has been observed that the processed materials exiting the grinder have a relatively low residual gas content, generally between about 0.1% and 0.5%, whereas the initial gas content of the waste feed material was about 4%.

The following examples are meant to be illustrative rather than limitative of the present invention.

EXAMPLE 1

Thermoplastic waste material from polystyrene foam boards containing a bromine derivative as a fire retardant agent, and having an apparent density of about 25 kg/m$^3$, were ground into powdered form in order to obtain a product having a particle size distribution as follows:

| Average Size (mm) | Quantity % |
|---|---|
| Less than 1.7 | 28 |
| Greater than 1.7 but less than 2.6 | 18 |
| Greater than 2.6 but less than 4.0 | 41 |
| Greater than 4.0 but less than 10.0 | 12 |

-continued

| Average Size (mm) | Quantity % |
|---|---|
| | 99 |

The foamed thermoplastic material in powdered form was introduced into the feed hopper of the furnace previously described, and uniformly dispersed with an electromagnetic exciter onto the upper vibrating plate of the furnace at a thickness of about 5 mm. The feed rate into the furnace was 150 kg of waste material per hour. The electrical resistance heaters were utilized to maintain the temperature at the inlet to the furnace at 185° C. and an outlet temperature of about 200° C. The residence time of the material in the furnace was 3 seconds. At the furnace outlet, the processed material was recovered and transferred to a grinder. The apparent density of the processed material was determined to be 175 kg/m$^3$. The residual gas content of the processed material was 0.2%, whereas that of the waste feed material was 1.1%. No degradation of the processed material was observed since the solution viscosity was measured at 17.6 centistokes both before and after the processing. By way of comparison, a screw extruder was fed with a sample of the same waste material. The rate of production was only 45 kg/hr. In addition, degradation of the processed product was observed.

EXAMPLE 2

Waste material of expanded polystyrene beads having an apparent density of 16 kg/m$^3$, was fed into the furnace at a flow rate of 100 kg/hr. The bead layer on the vibrating plates was about 4 mm thick. The residence time in the furnace was 3 seconds. The temperature was regulated so that the temperature at the furnace outlet was 190° C. At the outlet end of the furnace, the processed material in the form of very thin agglomerated beads was recovered. No trouble was encountered in transporting this product, nor in grinding it into finer particles. The final density of the processed material was 115 kg/m$^3$.

EXAMPLE 3

The procedures of Example 2 were repeated, however, the beads were wetted with water before being introduced into the feed hopper of the furnace. The furnace was fed at a rate of 110 kg/hr. The apparent density of the processed material was 120 kg/m$^3$. By way of comparison, expandable polystyrene beads were introduced into a screw extruder, however, no processed material was obtained, apparently due to the inability of the extruder to draw the beads into the screw section.

EXAMPLE 4

Particle-sized waste material comprising sheets of polyethylene foam having a density of 20 kg/m$^3$, was introduced into the feed hopper of the furnace. This waste material was uniformly dispersed on the upper vibrating plate by the electromagnetic exciter. The feed rate was 110 kg/hr. The inlet end of the furnace was regulated in order to obtain a temperature of 120° C., whereas the resistance heaters above the lowermost vibrating plate were regulated to obtain a temperature thereof 140° C. The material was moved constantly through the furnace. The residence time in the furnace was 3 seconds. At the furnace outlet, the processed material was recovered and compacted between a metallic roller and a conveyor belt. The material was then ground into powder. The apparent density of the processed material was 132 kg/m$^3$.

The examples above clearly show the advantages of the process and apparatus of the present invention. Although several specific preferred embodiments of the present invention have been described in the detailed description above, this description is not intended to limit the invention to the particular form or embodiments disclosed herein since they are to recognized as illustrative rather than restrictive, and it will be obvious to those skilled in the art that the invention is not so limited. Thus, the invention is declared to cover all changes and modifications of the specific embodiments of the invention herein disclosed for purposes of illustration which do not constitute departures from the spirit and scope of the invention.

What is claimed is:

1. A process for increasing the apparent density of foamed thermoplastic resin waste material comprising the steps of:
   (a) reducing said waste material to particle form;
   (b) introducing said waste material uniformly across at least one vibrating plate in an overhead-heated chamber to expose the material to heat emanating from above the vibrating plate;
   (c) transporting said waste material such that the waste material particles tumble through the overhead-heated chamber;
   (d) exposing the waste material to a progressively increasing temperature in said overhead-heated chamber of at least 120° C. at the overhead-heated chamber inlet to less than about 210° C. at the overhead-heated chamber outlet;
   (e) reducing the volume of the waste material at least 75% by compaction; and,
   (f) cooling the compacted waste material.

2. The process of claim 1 wherein said waste resin is selected from the group consisting of polystyrene and polyethylene.

3. The process of claim 1 wherein the overhead-heated chamber is fed with expandable beads of thermoplastic resin.

4. The process of claim 1 wherein the overhead-heated chamber is fed with expanded beads of thermoplastic resin.

5. The process of claim 1 wherein the waste material is distributed onto at least three vibrating plates located in stepped configuration within the overhead-heated chamber.

6. The process of claim 2 wherein the foamed polystyrene waste material is submitted to a temperature of at least 150° C. at the overhead-heated chamber inlet and less than about 210° C. at the overhead-heated chamber outlet.

7. The process of claim 2 wherein the foamed polystyrene waste material is submitted to a temperature of at least 190° C. at the overhead-heated chamber inlet and less than about 200° C. at the overhead-heated chamber outlet.

8. The process of claim 2 wherein the polyethylene foam waste material is submitted to a temperature of at least 120° C. at the overhead-heated chamber inlet and less than 140° C. at the overhead-heated chamber outlet.

9. The process of claim 6 wherein the residence time of waste material in the overhead-heated chamber is between about 2 and about 10 seconds.

10. The process of claim 8 wherein the residence time of the waste material in the overhead-heated chamber is between about 2 and about 10 seconds.

11. The process of claim 9 wherein the residence time of the waste material in the overhead-heated chamber is between about 2 and about 5 seconds.

12. The process of claim 1 further comprising the step of wetting said waste material particles with water prior to said introducing step.

13. Apparatus for increasing the apparent density of thermoplastic resin foam waste materials comprising:
   (a) means to subject the thermoplastic waste materials to tumbling, cascading, and progressively increasing temperatures in a overhead-heated chamber comprising several plates in cascading order;
   (b) means to disperse this waste material uniformly onto the upper plate;
   (c) means to transport the waste material through said an overhead-heated chamber;
   (d) means to recover the waste material from the overhead-heated chamber; and,
   (e) compacting means to reduce the volume of the waste material at least 75%; and 14. The apparatus of claim 13 wherein the foamed thermoplastic resin waste material has an initial apparent density ranging from about 5 kg/m$^3$ to about 150 kg/m$^3$.

15. The apparatus of claim 13 wherein the means to transport the waste material through the overhead-heated chamber comprises vibrating plates.

16. The apparatus of claim 14 wherein the means to heat the waste material comprises electrical resistance heaters.

17. The apparatus of claim 14 wherein the means to heat the waste material comprises infra red heaters adapted for emitting infra red radiation having a wave length of between about 1.5 and about 10 micrometers.

* * * * *